United States Patent Office 3,376,079
Patented Apr. 2, 1968

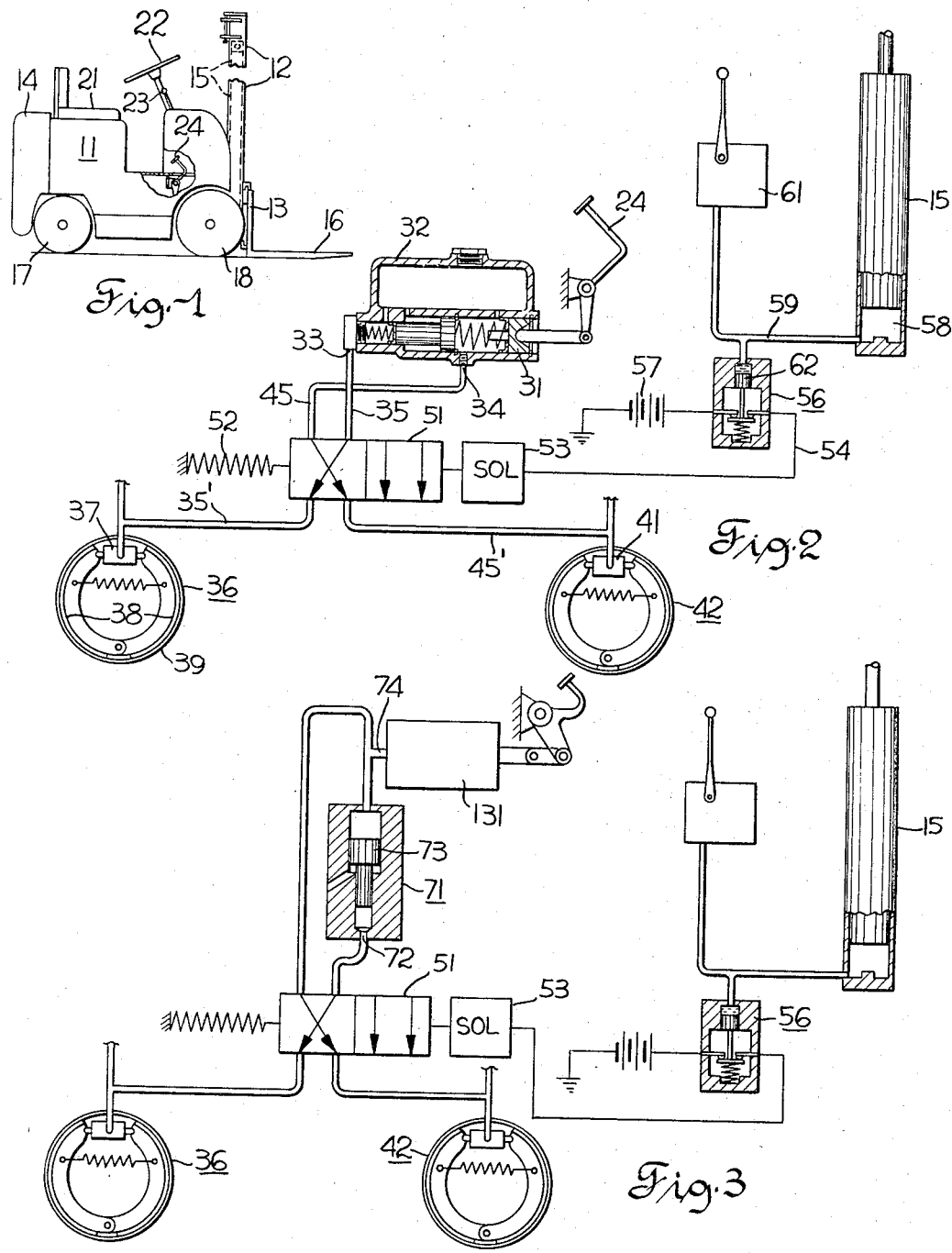

3,376,079
LOAD RESPONSIVE BRAKING SYSTEM
Neil J. Ryskamp, Markham, Ill., assignor to Allis-Chalmers Manufacturing Company, Milwaukee, Wis.
Filed Apr. 29, 1966, Ser. No. 546,302
5 Claims. (Cl. 303—22)

ABSTRACT OF THE DISCLOSURE

The rear wheel brakes of a lift truck are supplied greater braking force than the front wheel brakes when the load carried by the lift ram is below a predetermined amount, in which condition the rear wheels are more heavily loaded than the front wheels because of the rear counterweight. When the lift ram load is above such predetermined amount, the front wheels receive greater effort than the rear wheels. Outputs with pressure fluid at two pressure levels are provided on the truck and connected, respectively, through a reversing value to the front and rear fluid brake circuits. The reversing value means is automatically shifted when the pressure in the lift cylinder exceeds a predetermined value.

---

In a lift truck or similar vehicle such as a front end loader, the axle loading is widely variable because of the varying load conditions during operation. A large percentage of the braking effort is lost when using a conventional braking system because unequal axle loading results in unequal traction. In a lift truck having four wheel brakes the wheels of the heavier loaded axle provide the largest portion of the stopping effort, while the wheels on the lightly loaded axle tend to lock and slide. This occurs because the fluid pressure is equally distributed in the conventional four wheel braking system and the braking effort applied to the wheels of the lightly loaded axle is largely wasted. The locking of the wheels on the lightly loaded axle causes the wheels to skid and thereby reduces tire life. In some instances the skidding of tires during braking can result in loss of vehicle control which of course can be dangerous.

It is an object of this invention to provide more effective vehicle braking and achieve longer tire life by applying the greatest braking effort to the wheels having the greatest traction.

It is a further object of this invention to provide an improved braking system for a four wheel vehicle in which the rear wheels are more heavily loaded than the front wheels when little or no pay load is carried and the reverse loading occurs when a normal pay load is carried.

It is a further object of this invention to provide a braking system as outlined in the previous object in which greater braking effort is applied to the rear wheels than to the front wheels when little or no load is carried and greater braking effort is applied to the front wheels than to the rear wheels when the pay load exceeds a predetermined amount.

It is a further object of this invention to provide an improved braking system for a four wheel vehicle wherein the wheels with the greatest load receive the greatest braking effort thus reducing total operator effort required for effective braking, increasing tire life and providing better control of the vehicle.

It is a further object of this invention to provide a braking system of the hereinbefore outlined character wherein two pressure levels are provided in the braking system and the higher pressure is automatically connected to the brakes of the wheels having the greatest loading.

It is a further object of this invention to provide a four wheel system in which fluid pressure apparatus supplies braking fluid at two different pressure levels to a reversing valve controlled by an electric circuit having switch means responsive to pressure in a load supporting lift ram.

These and other objects and advantages of this invention will be apparent when the following description is read in conjunction with the drawings in which:

FIG. 1 shows a lift truck in which the present invention is used;
FIG. 2 schematically shows a first embodiment of the braking system of this invention; and
FIG. 3 shows a second embodiment of the braking system of this invention.

FIG. 1 illustrates a lift truck 11 having load carrying means including a mast 12 and lift ram 15 supporting a load carriage 13 through chains, not shown. To counterbalance the lift truck 11 a counterweight 14 is secured to the rear end of the vehicle. When the truck is carrying little or no pay load on the forks 16 of the carriage 13, the rear wheels 17 will be more heavily loaded than the front wheels 18, due to the load imposed thereon by the counterweight 14. However, when a substantial load is supported on the carriage the front wheels 18 will be more heavily loaded than the rear wheels 17. Thus, when such a truck is operating with a conventional braking system, in which equal pressure is applied to the brakes for the wheels 17, 18, the rear wheels 17 will accomplish the major portion of the braking effort when little or no load is supported on the carriage 13 and the front wheels 18 will tend to lock and skid during braking. On the other hand, when a substantial load is carried by the carriage 13 the front wheels will have the greatest traction and the greatest braking effort will be applied by the front wheels. The rear wheels 17 in the latter case will tend to skid during braking resulting in tire wear and loss of vehicle control. The vehicle is equipped with the usual operator's station 21, steering wheel 22, control lever 23 for the lift ram control valve and brake pedal 24.

In FIG. 2, I illustrate a first embodiment of my invention wherein a stepped diameter piston 31 of the master cylinder 32 is operable by manual control member or pedal 24 to generate a high pressure at outlet 33 and a low pressure at outlet 34. As illustrated, the lift ram 15 is lightly loaded and the high fluid pressure is applied to the rear brakes 36, only one of the two of which is shown, through conduits 35, 35'. The brake 36 includes a conventional wheel cylinder 37 for moving the brake shoes 38 against the brake drum 39 secured to one of the rear wheels 17. The lower pressure level outlet 34 is connected to the wheel cylinder 41 of one of the two front wheel brakes 42 by way of conduits 45, 45'. Thus during braking, the brakes of the more heavily loaded rear wheels will be applied with the greatest force. This is desirable since the rear wheels 17 will be more heavily loaded and hence in braking will have the greatest traction. The more lightly loaded front wheels 18 will appropriately receive less braking since they will be less effective in stopping the vehicle because of their lower traction. The differential area piston 31 may, for instance, be proportioned to deliver 1.75 times as high a pressure at outlet 33 as that at outlet 34. While this pressure differential provides the correct proportioning of braking effort for some lift trucks, other proportions may be provided for other material handling vehicles.

When the lift truck 11 is carrying a normal pay load on the carriage 13, the front wheels 18 will be more heavily loaded than the rear wheels 17 and to provide the greatest braking effort on the front wheels 18 I provide means for switching the connection of the wheel cylinders 37, 41 to outlets 33, 34. The means provided includes a valve 51 which is biased by a tension spring 52 to the left as viewed in FIG. 2. The valve is operated by an electrically energized transducer in the form of a solenoid 53 which, as illustrated, has shifted the valve 51 to the right by virtue of its being energized by an electric circuit 54. The electric circuit 54 includes a pressure sensitive switch 56 and a source of electric energy in the form of a battery 57. As illustrated in FIG. 2, the load on the lift ram 15 is not sufficiently great to cause normally closed pressure switch 56 to be opened. When the lift ram is carrying a normal pay load, the pressure in its pressure chamber 58 and the hydraulic conduit 59 connecting the chamber 58 to the control valve 61 will be sufficiently great to move the switch plunger 62 downwardly to open the pressure switch. When the switch 56 opens, the solenoid 53 is deenergized, thereby permitting the spring 52 to pull the valve 51 to the left to a position of adjustment in which the high pressure outlet 33 is connected to the front wheel brakes 42 and low pressure outlet 34 is connected to the rear wheel brakes 36. Thus during braking with a normal pay load, the more heavily loaded front wheels will be braked with greater force than the rear wheels and skidding of the rear wheels will not be apt to occur.

The braking system shown in FIG. 3 is similar to that shown in FIG. 2 except that a conventional master cylinder 131 is employed and a pressure amplifier 71 is used to provide a high pressure at its outlet 72. The differential area piston 73 of the pressure amplifier 71 can be proportioned so that the pressure at the high and low pressure outlets 72, 74 is at the desired ratio for most efficient braking.

My braking system reduces tire wear, by obviating skidding heretofore experienced, and makes more efficient use of braking effort by applying greatest braking effort to the wheels with greatest traction. My system is automatic for most effective use and operator convenience. In event of electrical failure or circuit breakage the valve 51 will be moved to the left in which position the front wheel brakes will receive the higher level of brake pressure, thus providing effective and safe braking when most needed, that is during loaded condition of the truck.

The embodiments of the invention for which an exclusive property or privilege is claimed are defined as follows:

1. In a material handling vehicle having front and rear wheels and means for supporting a load at its front end including a hydraulic lift ram, a brake system comprising:
    a manually operated brake control member,
    fluid operated front and rear wheel brakes,
    fluid pressurizing apparatus connected to said control member including a pair of outlets and means for delivering fluid to said outlets at high and low pressure levels, respectively, upon operation of said brake control member,
    conduits connecting said outlets to said front and rear wheel brakes, respectively,
    a valve connected to said conduits having
        a first position in which the high pressure outlet is connected to said rear wheel brakes and the low pressure outlet is connected to said front wheel brakes, and
        a second position in which said front and rear wheel brakes are connected to said high and low pressure outlets, respectively, and
    actuating means adjusting said valve from its first position to its second position when the load on said lift ram exceeds a predetermined amount.

2. The structure set forth in claim 1 wherein said actuating means adjusts said valve to its second position in response to the hydraulic pressure in said lift ram exceeding a predetermined pressure.

3. The structure set forth in claim 2 wherein said actuating means includes an electrically energized transducer connected in operating relation to said valve and an electric circuit for said transducer including a pressure switch in fluid communication with said lift ram.

4. The structure set forth in claim 3 wherein said transducer is a solenoid, said valve is biased to its second position and said switch is normally closed wherein said solenoid is energized and positions said valve in its first position, said switch being opened to deenergize said solenoid when said pressure in said lift ram exceeds said predetermined value.

5. The structure set forth in claim 1 wherein said predetermined amount of load causes the front wheels to be more heavily loaded than said rear wheels.

References Cited

UNITED STATES PATENTS 2,538,274  1/1951  Sanmori ---------- 188—195 X
2,845,149  7/1958  Stern et al. ---------- 188—195

DUANE A. REGER, *Primary Examiner.*